No. 808,849. PATENTED JAN. 2, 1906.
W. E. KOCH.
METHOD OF TREATING MOLTEN MATTE.
APPLICATION FILED FEB. 19, 1903.

WITNESSES
Warren W. Swartz
J. F. McConvin

INVENTOR
Walter E. Koch
by Bakewell & Byrnes
his attys

UNITED STATES PATENT OFFICE.

WALTER E. KOCH, OF PITTSBURG, PENNSYLVANIA.

METHOD OF TREATING MOLTEN MATTE.

No. 808,849.      Specification of Letters Patent.      Patented Jan. 2, 1906.

Application filed February 19, 1903. Serial No. 144,026.

*To all whom it may concern:*

Be it known that I, WALTER E. KOCH, of Pittsburg, Allegheny county, Pennsylvania, have invented a new and useful Method of Treating Molten Matte, of which the following is a full, clear, and exact description, reference being had to the accompanying drawings, forming part of this specification, in which—

Figure 3:
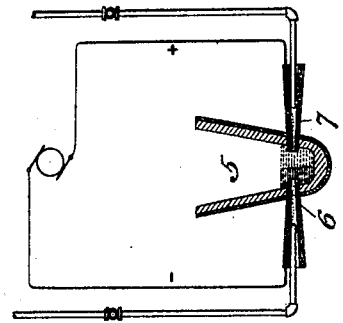
Figure 1:
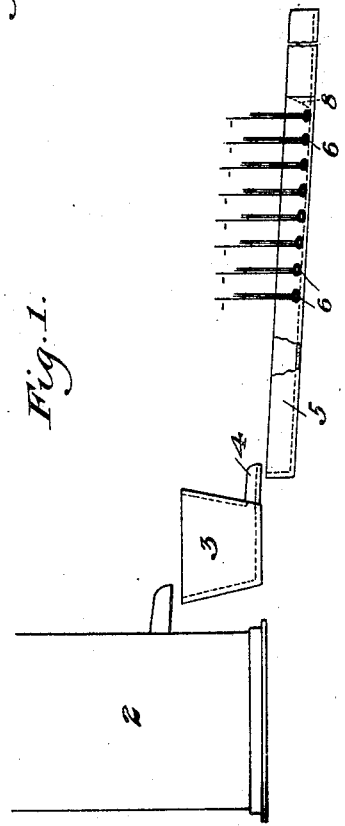
Figure 2:
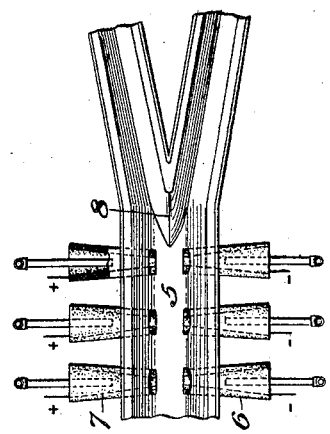

Figure 1 is a diagrammatic side elevation of a reducing or smelting furnace provided with my improved apparatus. Fig. 2 is a top plan view showing the lower portion of the trough, and Fig. 3 is a detail cross-section of the trough.

My invention relates to the treatment of mattes containing a mixture of different metals or their compounds, such as sulfids, and the object of the invention is to remove the sulfur and at least partially separate the metals.

In carrying out my invention I treat the matte while in molten condition by passing an electric current through it by means of electrodes, at least one of which and preferably both of which are tubular and through which gases are forced during the passage of the current.

The invention further consists in treating the matte in a continuous manner by flowing it through a trough wherein it is subjected to the action of the electric current and gases, as described.

In carrying out my invention, taking, for example, a copper matte containing iron, I preferably tap the matte from the smelting-furnace 2 of Fig. 1 into the forehearth 3. The matte settles to the bottom of this forehearth and is tapped through the spout 4 into an inclined trough 5. This trough is preferably provided with upwardly and outwardly diverging sides, as shown in Fig. 3, and into the opposite sides of this trough, which may be lined with refractory material, project the ends of oppositely-located electrodes 6 and 7. These electrodes are so arranged that the matte flows slowly between their ends, and the electrodes are tubular to allow air or gases to be forced through them at the same time. I preferably use water-gas for this purpose on account of the hydrogen and carbonic monoxid contained in it. The hydrogen combines with the sulfur in the matte to form a gas which passes off, while the carbonic monoxid serves to reduce and separate the iron in the ordinary manner. I may, however, use other gases or fluids, such as steam, hot air, producer-gas, &c. The electrolytic action of the current on the fused mattes causes the iron to be drawn toward one electrode and the copper toward the other, and I utilize this action to separate these two metals. For this purpose I place a splitter 8, of plow shape, at the mouth of the trough in such position that the iron will be deflected toward one side and the copper toward the other, thus separating them. The copper will contain the precious metals, if such are present. In practice the iron collects in the metallic state in lumps or masses in the mouth of the trough at one side of the splitter and is drawn out by the operator. The copper drops from the other side and chills in lumps of bullion. The electrodes are preferably formed of graphitized carbon and are preferably covered with a protecting coating to lengthen their life.

The advantages of my method will be appreciated by those skilled in the art. The Bessemerizing of copper matte is done away with and a quick, cheap, and efficient method of obtaining the copper is obtained.

The gases or fluids may be supplied to the matte by separate twyers instead of by hollow electrodes. The process may be carried out in a receptacle containing the matte and may be either intermittent or continuous, though I prefer the trough method on account of the easy separating of the two metals, and many changes may be made in the form and arrangement of the apparatus without departing from my invention.

I claim—

1. The method of treating molten mattes, which consists in forcing gases into a stream of molten matte, and electrolyzing said matte; substantially as described.

2. The method of treating molten mattes, consisting in flowing a stream of molten matte between electrodes, and electrolyzing the matte and simultaneously forcing gases into the stream of matte; substantially as described.

3. The method of treating molten mattes, consisting in electrolyzing the matte by passing a stream of it between electrodes and passing an electric current therethrough, forcing gases into the stream through the electrodes, and splitting the stream to separate one metal from the other; substantially as described.

4. The method of treating molten mattes containing copper and iron, consisting in electrolyzing the matte while flowing a stream of the matte between electrodes, and simultaneously forcing gases into the flowing stream; substantially as described.

5. The method of treating molten mattes containing copper and iron, consisting in electrolyzing the matte while flowing a stream of the matte between electrodes and separating the product into portions containing the iron and the copper; substantially as described.

In testimony whereof I have hereunto set my hand.

WALTER E. KOCH.

Witnesses:
L. M. REDMAN,
H. M. CORWIN.